(12) United States Patent
Hubbard

(10) Patent No.: US 8,187,458 B2
(45) Date of Patent: May 29, 2012

(54) OIL FILTER

(75) Inventor: Christopher M. Hubbard, Jefferson, OR (US)

(73) Assignee: Lifetime Oil Filter, Inc., Albany, OR (US)

(*) Notice: Subject to any disclaimer, the term of this patent is extended or adjusted under 35 U.S.C. 154(b) by 561 days.

(21) Appl. No.: 12/406,878

(22) Filed: Mar. 18, 2009

(65) Prior Publication Data

US 2010/0237022 A1 Sep. 23, 2010

(51) Int. Cl.
*B01D 35/143* (2006.01)
*B01D 35/147* (2006.01)
*B01D 35/14* (2006.01)

(52) U.S. Cl. .......... 210/90; 210/130; 210/342; 210/444; 210/450; 210/DIG. 13; 210/DIG. 17; 210/451

(58) Field of Classification Search .................. None
See application file for complete search history.

(56) References Cited

U.S. PATENT DOCUMENTS

| | | | |
|---|---|---|---|
| 3,726,403 A * | 4/1973 | Shaltis | 210/132 |
| 4,038,189 A | 7/1977 | Dison et al. | |
| 4,089,783 A * | 5/1978 | Holyoak | 210/358 |
| 4,622,136 A * | 11/1986 | Karcey | 210/167.09 |
| 5,066,391 A * | 11/1991 | Faria | 210/85 |
| 5,300,223 A | 4/1994 | Wright | |
| 5,411,659 A | 5/1995 | Nichols | |
| 5,569,373 A | 10/1996 | Smith | |
| 5,643,448 A | 7/1997 | Martin | |
| 5,711,872 A | 1/1998 | Jones | |
| 5,740,772 A * | 4/1998 | Bluma | 123/196 AB |
| 5,779,900 A | 7/1998 | Holm | |
| 5,785,850 A | 7/1998 | Lynch | |
| 5,814,211 A | 9/1998 | Leo | |
| 5,830,371 A | 11/1998 | Smith | |

(Continued)

FOREIGN PATENT DOCUMENTS

EP 9701385 6/1996

(Continued)

OTHER PUBLICATIONS

International search report and written opinion dated Oct. 26, 2010 for PCT Application No. US2010/027007.

*Primary Examiner* — Krishnan S Menon
(74) *Attorney, Agent, or Firm* — Wilson Sonsini Goodrich & Rosati

(57) ABSTRACT

An oil filter assembly is disclosed for a machine, such as an internal combustion engine, that has an oil output port and an oil input port. A mounting plate is fixed with an outer enclosure and is adapted for securing to the machine. The mounting plate is further adapted to conduct oil from the machine into a peripheral portion of the outer enclosure, and then returning oil from a central portion of the outer enclosure back to the machine. Oil may pass from the peripheral portion to the central portion through a primary filter having a first porosity. A pressure-actuated valve is fixed fluidly between the peripheral portion and central portion of the outer enclosure. Oil may pass through the pressure-actuated valve only when an oil pressure differential between the peripheral portion and the central portion of the outer enclosure exceeds a predetermined threshold pressure. A secondary filter has a second porosity greater than the first porosity, and is fixed fluidly between the pressure-actuated valve and the central portion of the outer enclosure.

10 Claims, 3 Drawing Sheets

U.S. PATENT DOCUMENTS

| | | |
|---|---|---|
| 5,895,568 A | 4/1999 | Koltunov |
| 6,006,924 A | 12/1999 | Sandford |
| 6,024,229 A | 2/2000 | Ayers |
| 6,068,762 A | 5/2000 | Stone |
| 6,085,915 A | 7/2000 | Schwandt |
| 6,488,848 B1 | 12/2002 | Smith |
| 6,540,914 B1 | 4/2003 | Smith |
| 6,709,575 B1 | 3/2004 | Verdegan |
| 7,413,089 B1 | 8/2008 | Tidwell |
| 2004/0035769 A1 | 2/2004 | Mouhebaty |
| 2006/0102533 A1 | 5/2006 | Faria |

FOREIGN PATENT DOCUMENTS

| | | |
|---|---|---|
| EP | 0773054 A1 | 7/1996 |
| JP | 2005-330928 A | 12/2005 |
| MX | 2006121319 A1 | 11/2006 |

* cited by examiner

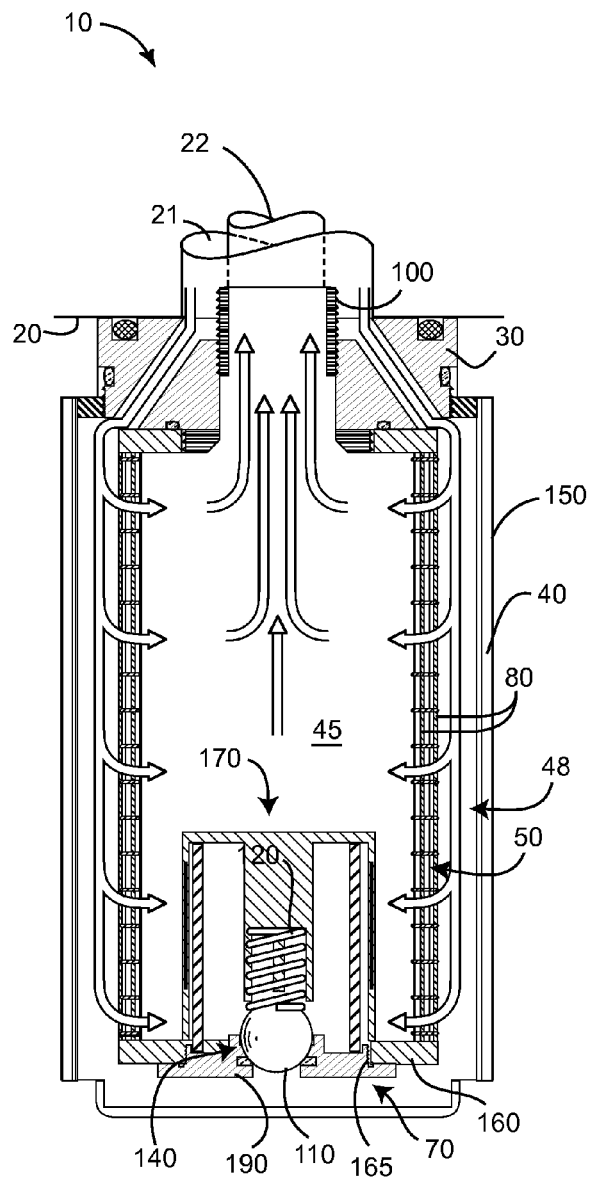
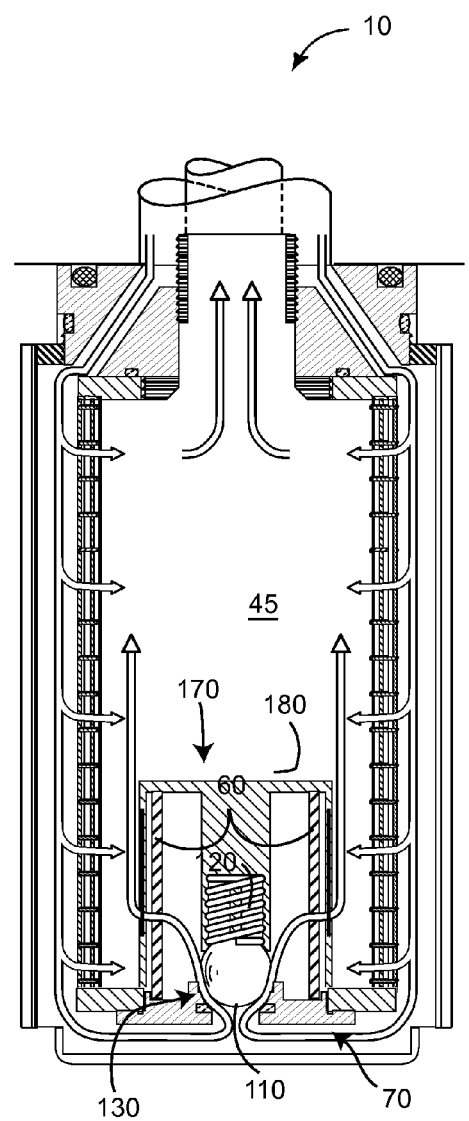
FIG. 1A
FIG. 1B

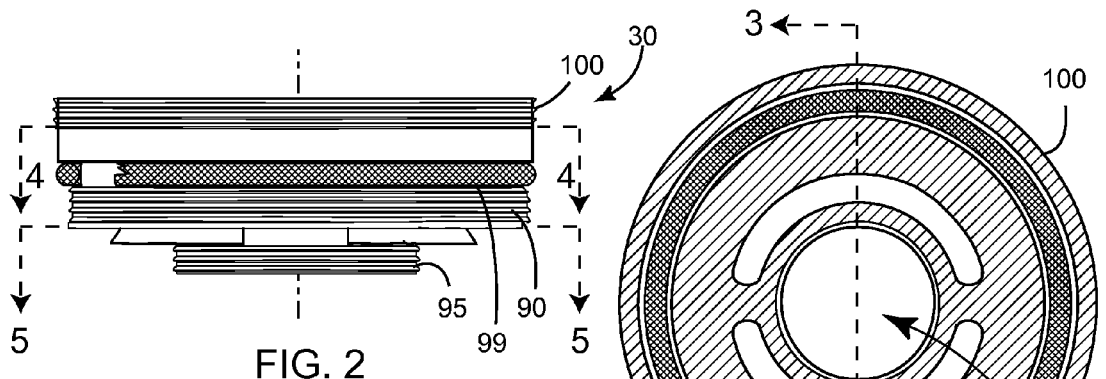
FIG. 2
FIG. 4
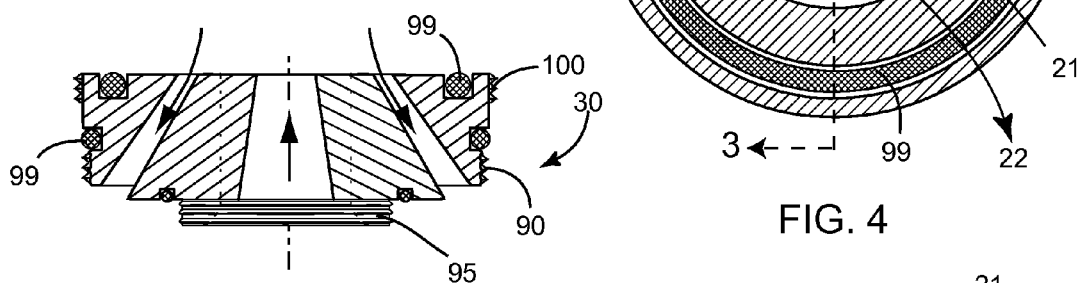
FIG. 3
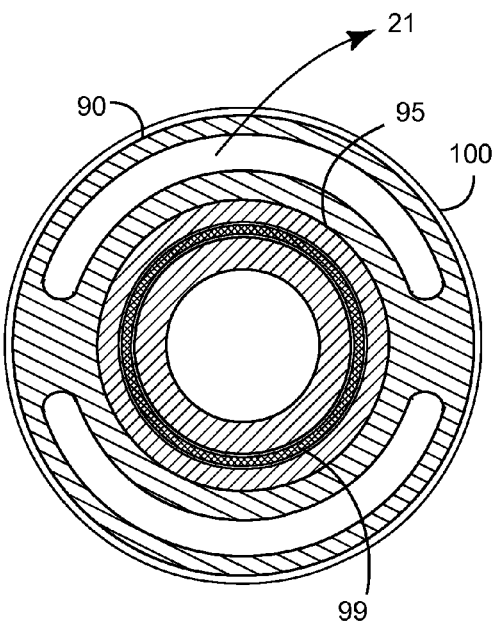
FIG. 5
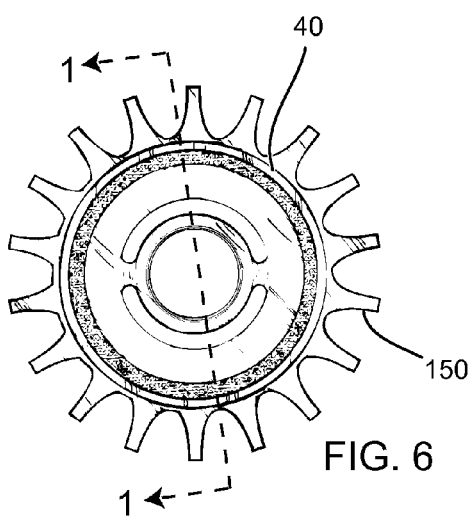
FIG. 6

OIL FILTER

CROSS-REFERENCE TO RELATED APPLICATIONS

Not Applicable.

STATEMENT REGARDING FEDERALLY SPONSORED RESEARCH AND DEVELOPMENT

Not Applicable.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

FIELD OF THE INVENTION

This invention relates to filters, and more particularly to an improved engine oil filter assembly.

DISCUSSION OF RELATED ART

Conventional oil filters for vehicle engines, such as automotive internal combustion engines, typically include a filter media and a bypass valve that is actuated when the filter media becomes dirty and substantially plugged. For example, U.S. Pat. No. 5,066,391 to Faria on Nov. 19, 1991 teaches such a device. One drawback with such devices is that once the bypass valve is opened, particulate debris that would normally be captured by the filter media is able to traverse the valve and re-enter the engine, leading to engine wear and eventual damage. However, forcing oil through a filter media has the drawback that once the filter media becomes plugged with particulate matter, not enough oil can get through the filter to effectively cool the engine, leading to much sooner engine damage than if even dirty oil were allowed to circulate. Another drawback of such devices is that particulate matter, once captured on a leading side of the filter media, can be dislodged from the filter to return back to the engine once the bypass valve opens, since flow of the oil at that point changes from through the filter media to across the filter media.

Other such filters are disclosed in U.S. Pat. No. 5,711,872 to Jones et al. on Jan. 27, 1998; U.S. Pat. No. 6,068,762 to Stone et al. on May 20, 2000; U.S. Pat. No. 6,540,914 to Smith on Apr. 1, 2003; and U.S. Pat. No. 7,413,089 to Tidwell on Aug. 19, 2008. These devices suffer many of the same drawbacks as the Faria device.

Therefore, there is a need for a device that overcomes the drawbacks associated with the prior art. Such a needed filter device would open a bypass valve once the primary filter becomes plugged, but would additionally filter the oil through a secondary more porous filter. Such a needed filter would be easily cleaned to restore the effectiveness of the primary filter, and would be made of durable materials that would last potentially longer than the machine to which it is fixed. Such a device would further provide for cooling of the oil as it passes therethrough. The present invention accomplishes these objectives.

SUMMARY OF THE INVENTION

The present device is an oil filter assembly for a machine, such as an internal combustion engine, that has an oil output port and an oil input port. A mounting plate is fixed with an outer enclosure, such as with a first set of cooperative threads, and is adapted for securing to the machine, such as with a second set of cooperative threads. The mounting plate is further adapted to conduct oil from the oil output port of the machine into a peripheral portion of the outer enclosure, and then returning oil from a central portion of the outer enclosure into the oil input port of the machine.

A primary filter has a first porosity. Oil may pass through the primary filter to move from the peripheral portion to the central portion of the outer enclosure. A pressure-actuated valve is fixed fluidly between the peripheral portion and central portion of the outer enclosure. Oil may pass through the pressure-actuated valve only when an oil pressure differential between the peripheral portion and the central portion of the outer enclosure exceeds a predetermined threshold pressure, such as when the primary filter 50 becomes dirty. A secondary filter has a second porosity greater than the first porosity, and is fixed fluidly between the pressure-actuated valve and the central portion of the outer enclosure.

As such, as oil traverses the oil filter assembly from the oil output port of the machine to the oil input port of the machine, the oil must pass through either the primary filter or, if the predetermined pressure threshold P has been reached, either the primary filter or the secondary filter. When the primary filter becomes dirty, such as after a predetermined number of machine operating hours, for example, the oil filter assembly may be disassembled and each component washed, preferably in a standard dishwasher or the like.

The present invention is a filter device that opens the bypass pressure-actuated valve once the primary filter becomes plugged, but additionally continues to filter the oil through the secondary more porous filter. The present device is easily cleaned, such as in a conventional household dishwasher, to restore the effectiveness of the primary filter, and is made of durable materials that can last potentially longer than the vehicle or machine to which it is installed. The present invention further cools the oil as it passes therethrough. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1A is a cross-sectional view of the invention, illustrating a flow of oil through a primary filter within an outer enclosure of the invention;

FIG. 1B is a cross-sectional view of the invention of FIG. 1A, wherein a pressure differential between peripheral and central portions of the enclosure exceeds a threshold pressure to open a pressure-actuated valve of the invention, illustrating a flow of oil through both the primary filter and a secondary filter;

FIG. 2 is a side elevational view of a mounting plate of the invention;

FIG. 3 is a cross-sectional view of the mounting plate, taken generally along lines 3-3 of FIG. 4;

FIG. 4 is a bottom plan view thereof;

FIG. 5 is a top plan view thereof;

FIG. 6 is a bottom plan view of the invention;

DETAILED DESCRIPTION OF THE PREFERRED EMBODIMENT

Figure 7:
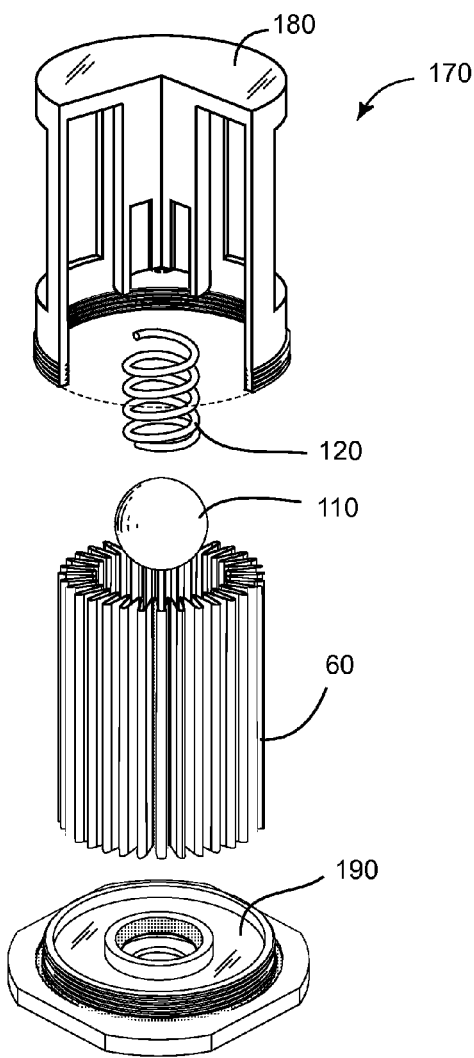
FIG. 7 is an exploded perspective view of a secondary filter assembly of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. The words "oil" or "oils," when used the description and the claims, shall refer to any liquid to be filtered, and are not necessarily limited to engine or machine lubricating fluids.

FIGS. 1A and 1B illustrate an oil filter assembly 10 for a machine 20, such as an internal combustion engine, that has an oil output port 21 and an oil input port 22. A mounting plate 30 (FIGS. 2-5) is fixed with an outer enclosure 40, such as with a first set of cooperative threads 90, and is adapted for securing to the machine 20, such as with a second set of cooperative threads 100. The mounting plate 30 is further adapted to conduct oil from the oil output port 21 of the machine 20 into a peripheral portion 48 of the outer enclosure 40 (FIG. 1A), and then returning oil from a central portion 45 (FIGS. 1A and 1B) of the outer enclosure 40 into the oil input port 22 of the machine 20. In one embodiment, the enclosure 40 includes a plurality of cooling fins 150 (FIG. 6) protruding radially therefrom. Further, the mounting plate 30 may include several viton seals 99 (FIGS. 3-5), as is known in the art.

Figure 8:
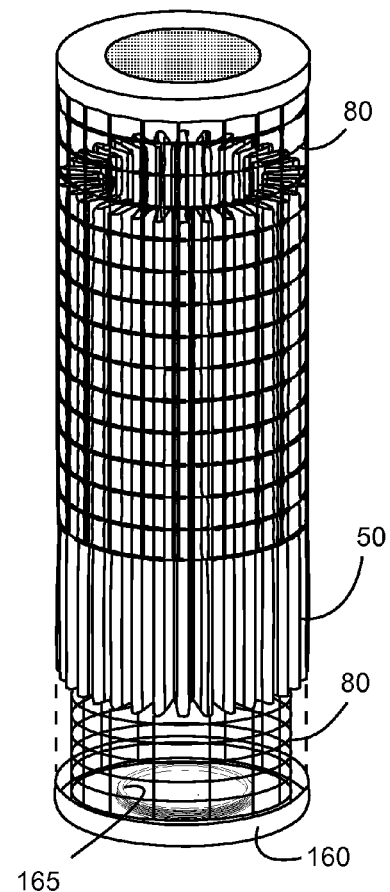
FIG. 8 is a partially exploded view of the primary filter of the invention.

A primary filter 50 has a first porosity $P_1$, preferably less than 15 microns. In one embodiment, the first porosity $P_1$ is about 5 microns. Oil may pass through the primary filter 50 to move from the peripheral portion 48 to the central portion 45 of the outer enclosure 40. In one embodiment, the primary filter 50 is sandwiched between two semi-rigid protective grids 80 (FIG. 8) each made from a durable, dishwasher safe material such as a metallic stainless mesh material, or the like. Such semi-rigid protective grids 80 help maintain the shape of the primary filter 50 while in use within the enclosure 40.

Figure 9:
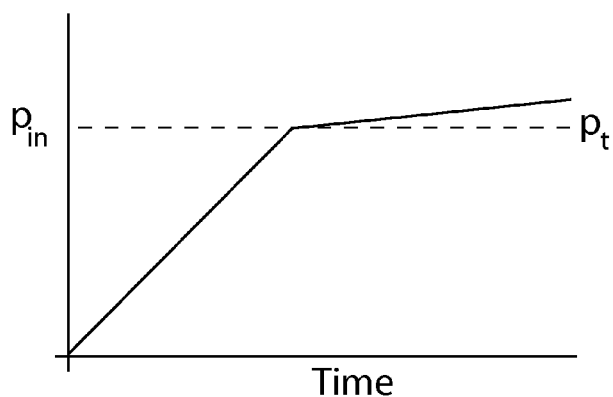
FIG. 9 is a pressure diagram showing a pressure within the enclosure over time, as the primary and secondary filters become dirty and clogged.

A pressure-actuated valve 70 is fixed fluidly between the peripheral portion 48 and central portion 45 of the outer enclosure 40. Oil may pass through the pressure-actuated valve 70 only when an oil pressure differential between the peripheral portion 48 and the central portion 45 of the outer enclosure 40 exceeds a predetermined threshold pressure $P_t$, such as when the primary filter 50 becomes dirty or clogged with debris (FIG. 9). In embodiment the pressure-actuated valve 70 is a ball valve that includes a ball 110 biased in a closed position 130 with a spring 120. The ball 110 may be urged into an open position 140 when the threshold pressure $P_t$ is exceeded. Preferably the ball 110 and other components are durable and easily cleaned, such as titanium or tungsten.

A secondary filter 60 has a second porosity $P_2$, $P_2$ being greater than $P_1$, and is fixed fluidly between the pressure-actuated valve 70 and the central portion 45 of the outer enclosure 40 (FIGS. 1B and 7). Preferably $P_2$ is greater than about 15 microns, and in one embodiment is about 25 microns.

In one embodiment, the primary filter 50 is substantially cylindrical and includes an end cap 160 (FIG. 8) that has a threaded aperture 165 for mounting thereto a secondary filter assembly 170 (FIG. 7). The secondary filter assembly 170 includes a secondary filter housing 180 that at least partially encloses the secondary filter 60 and fixes the secondary filter 60 and the pressure-actuated valve 70 to the end cap 160 with a ball seat and seal plate 190.

As such, as oil traverses the oil filter assembly 10 from the oil output port 21 of the machine 20 to the oil input port 22 of the machine 20, the oil must pass through either the primary filter 50 or, if the predetermined pressure threshold $P_t$ has been reached, either the primary filter 50 or the secondary filter 60. With the cooling fins 150 of the enclosure 40, the oil is cooled as it passes through the peripheral portion 48 of the enclosure 40. When the primary filter 50 becomes dirty, such as after a predetermined number of machine operating hours, for example, the oil filter assembly 10 may be disassembled and each component washed, preferably in a standard dishwasher or the like. As such, the primary and secondary filters 50, 60 are preferably made from a material that is dishwasher safe, corrosion resistant, and durable, such as a titanium mesh, a metallic stainless mesh, a hybrid ceramic material, or the like.

While a particular form of the invention has been illustrated and described, it will be apparent that various modifications can be made without departing from the spirit and scope of the invention. For example, a ball valve is illustrated as the pressure-actuated valve 70 in the drawings, but a pin-valve or other equivalent pressure-actuated valve 70 may also be used. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An oil filter assembly for a machine that provides an oil output port and an oil input port, the oil filter assembly comprising:
   a mounting plate fixed with an outer enclosure, the mounting plate adapted for securing to the machine, for conducting oil from the oil output port of the machine into a peripheral portion of the outer enclosure, and for returning oil from a central portion of the outer enclosure into the oil input port of the machine;
   a primary filter having a first porosity and through which oil may pass to move from the peripheral portion to the central portion of the outer enclosure;
   a pressure-actuated valve fixed fluidly between the peripheral and central portions of the outer enclosure and through which oil may pass only when an oil pressure differential between the peripheral portion and the central portion of the outer enclosure exceeds a predetermined threshold; and
   a secondary filter having a second porosity greater than the first porosity and fixed fluidly between the pressure-actuated valve and the central portion of the outer enclosure;
   whereby oil traversing through the oil filter assembly must pass through either the primary filter, or, if the predetermined pressure threshold has been reached, either the primary or the secondary filter, and
   wherein the primary filter is substantially cylindrical and includes an end cap with a threaded aperture for mounting thereto a secondary filter assembly that includes a secondary filter housing that at least partially encloses the secondary filter and fixes the secondary filter and the pressure-actuated valve to the end cap with a ball seat and seal plate.

2. The oil filter assembly of claim 1 wherein the primary and secondary filters are each made from a material that is dishwasher safe and corrosion resistant.

3. The oil filter assembly of claim 2 wherein the primary and secondary filters are each made from a titanium mesh.

4. The oil filter assembly of claim 1 wherein the primary filter has a porosity of less than about 15 microns.

5. The oil filter assembly of claim 1 wherein the secondary filter has a porosity of greater than about 15 microns.

6. The oil filter assembly of claim 1 wherein the primary filter is sandwiched between two semi-rigid protective grids.

7. The oil filter assembly of claim 1 wherein the mounting plate is fixed to the outer enclosure with a first set of cooperative threads.

8. The oil filter assembly of claim 1 wherein the mounting plate is secured to the machine with a second set of cooperative threads.

9. The oil filter of claim 1 wherein the pressure-actuated valve includes a ball valve biased in a closed position with a spring.

10. The oil filter of claim 1 wherein the outer enclosure further includes a plurality of cooling fins protruding radially therefrom.

\* \* \* \* \*